United States Patent [19]

Bell et al.

[11] 4,127,488

[45] Nov. 28, 1978

[54] METHOD AND APPARATUS FOR SEPARATING SOLIDS FROM LIQUIDS

[75] Inventors: James A. Bell, Prairie Village; Robert B. Higgins, Lenexa; Donald G. Mason, Overland Park; John C. Weaver, Olathe; Marvin E. Wood, Lenexa, all of Kans.

[73] Assignee: Ecodyne Corporation, Lincolnshire, Ill.

[21] Appl. No.: 842,850

[22] Filed: Oct. 17, 1977

[51] Int. Cl.$^2$ .......................... C02C 1/18; B01D 21/24
[52] U.S. Cl. .................................................. 210/519
[58] Field of Search ................. 210/523, 528, 532 RS, 210/513, 519

[56] References Cited

U.S. PATENT DOCUMENTS

| | | | |
|---|---|---|---|
| 2,458,061 | 1/1949 | Coulter | 210/528 |
| 2,961,099 | 11/1960 | Lind et al. | 210/519 |
| 3,302,792 | 2/1967 | Hikes et al. | 210/519 |
| 3,395,800 | 7/1968 | Kraus et al. | 210/66 |
| 3,534,861 | 10/1970 | Hubbell | 210/528 |
| 3,891,557 | 6/1975 | Edgerton | 210/519 |
| 4,026,799 | 5/1977 | Hildreth | 210/532 R |
| 4,059,529 | 11/1977 | McGivern | 210/519 |

*Primary Examiner*—William A. Cuchlinski, Jr.
*Assistant Examiner*—Jon Hokanson
*Attorney, Agent, or Firm*—Charles M. Kaplan; Joel E. Siegel

[57] ABSTRACT

A clarification device for solids-liquid separation by gravitational settling has a peripheral inlet trough connected to a plurality of uniformly spaced inlet conduits which direct influent liquid and solids toward the center of the clarifier. The size of the hole in the inlet trough communicating with each inlet conduit can be selectively controlled and individually changed. This enables the volume of liquid and solids withdrawn through each hole to be controlled so as to cause the velocity energy decrease at each hole to generally equal the friction energy loss between any hole and the preceding hole while maintaining about the same volume of discharge flow into the clarifier through each inlet conduit.

15 Claims, 4 Drawing Figures

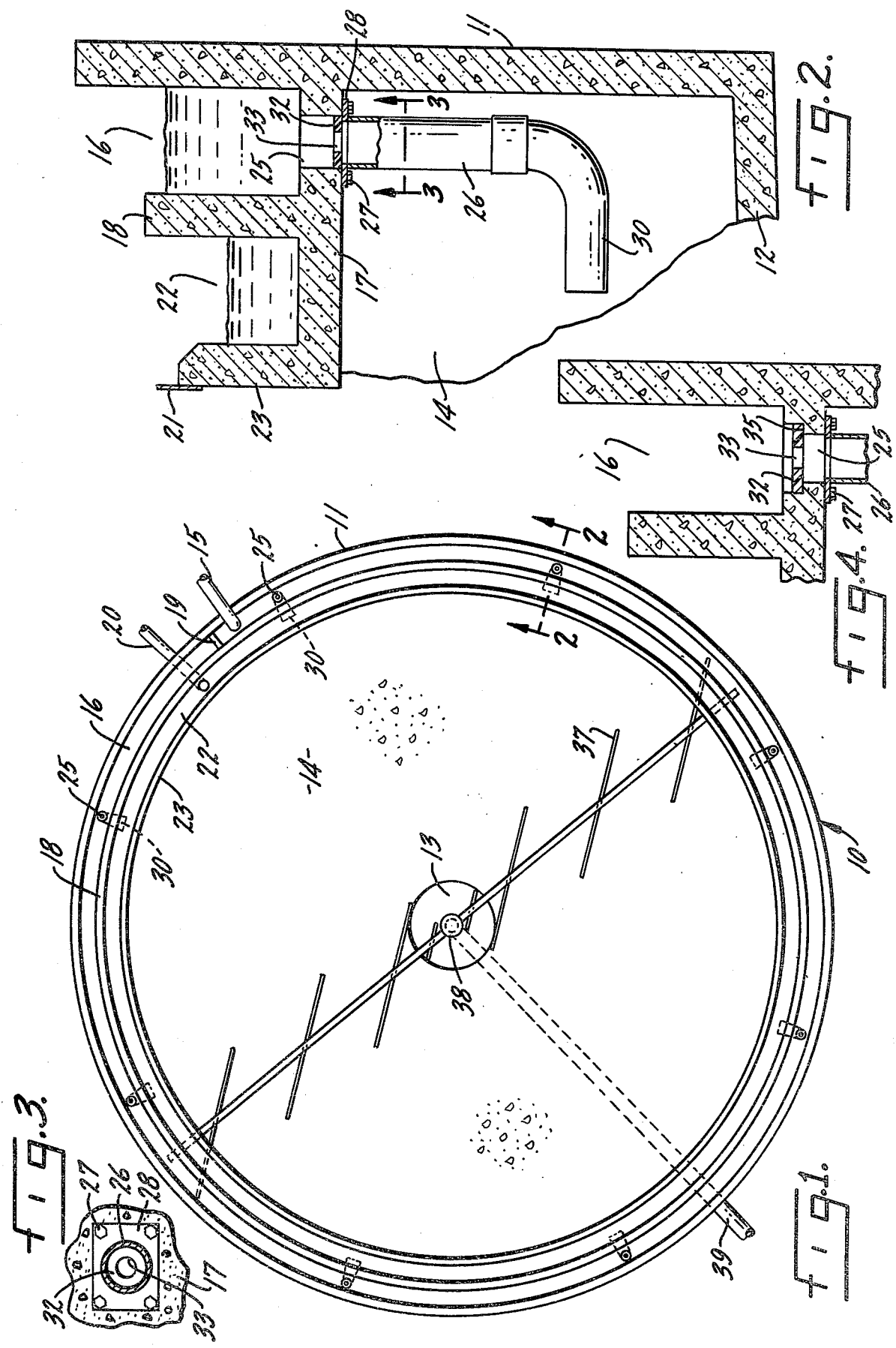

METHOD AND APPARATUS FOR SEPARATING SOLIDS FROM LIQUIDS

BACKGROUND OF THE INVENTION

This invention relates to methods and apparatus for separating solids from liquids, and more particularly to improved methods and clarifiers for separating activated sewage sludge from mixed liquor, and other light flocculant suspensions of solids.

In prior sewage clarifiers employing peripheral downcomers for introducing influent toward their center, it was not always possible to obtain uniform flow distribution, and this reduces process efficiency. When flow rates temporarily or permanently depart from design parameters, severe process upsets can result. Also, changes in inlet flow can disturb the settled sludge blanket or produce eddy currents which cause solids to short circuit the settling tank and flow directly to the effluent weir.

SUMMARY OF THE INVENTION

Accordingly, it is an object of this invention to provide improved methods and apparatus for separating solids from liquids.

Another object is to provide a method and apparatus for clarifying a liquid which generally balances velocity energy loss against friction energy loss while maintaining approximately equal flow volume from numerous inlet conduits.

Another object is to provide a way of selectively controlling and individually changing the size of the influent conduit entrance holes in a clarifier and thereby obtaining generally equal flow distribution through each hole over a wide range of flow rates.

Another object is to prevent disturbance of settled solids in a peripheral feed clarifer utilizing influent downcomers aimed toward the center of the clarifier.

Another object is to provide generally uniform flow distribution around a peripheral influent channel of a clarifier and to prevent deposition of solids therein.

Another object is to provide methods and apparatus for clarifying sewage fed in through centrally discharging peripheral downcomers that are readily adjustable to accomodate changing flow rates and process conditions, are relatively inexpensive to construct and easy to maintain, and which do not possess defects found in similar prior art methods and devices.

Other objects and advantages of the invention will be found in the specification and claims and the scope of the invention will be pointed out in the claims.

DESCRIPTION OF THE DRAWING

FIG. 1 is a top plan, partially broken-away, schematic representation of apparatus in accord with this invention.

FIG. 2 is an enlarged, cross sectional, partially broken-away view taken along the line 2—2 in FIG. 1.

FIG. 3 is a broken-away view taken along the line 3—3 in FIG. 2.

FIG. 4 is an enlarged cross sectional view corresponding to FIG. 2 but showing another way of supporting a perforated disc in an influent hole.

DESCRIPTION OF PREFERRED EMBODIMENTS

The drawing shows a cylindrical concrete clarifier tank 10 for gravitational settling of solids, such as activated sludge, from a liquid, such as sewage mixed liquor. Tank 10 has an upstanding peripheral side wall 11 and a bottom 12 which slopes toward a sludge collection pit 13 at its center; side wall 11 and bottom 12 define a settling chamber 14. An incoming mixture of solids and liquid flows through a pipe 15 into an influent trough 16 defined by the upper end of side wall 11, a bottom 17, and a common wall 18. A dam 19 across trough 16 causes the incoming mixture to flow in a clockwise direction. Clarified liquid leaves settling chamber 14 through a pipe 20 after flowing over a conventional vertically adjustable weir 21 into a peripheral effluent trough 22 defined by common wall 18, bottom 17 and a wall 23. Preferably, troughs 16 and 22 are uniform in cross section.

The influent mixture flows into settling chamber 14 through an even number of diametrically opposed, uniformly spaced holes 25 passing through trough bottom 17. An inlet downcomer conduit 26 is attached to trough 16 directly beneath each hole 25 by bolts 27 passing through holes in a flange 28 that defines perforated plate means at the upper inlet end of each conduit 26 (see FIGS. 2 and 3). A nozzle 30 at the lower outlet end of each conduit 26 points directly toward another such nozzle 30 at the opposite end of a diameter of tank 10. Nozzles 30 are located about two-thirds of the way down from the static liquid level in chamber 14. Thus, the influent mixture is discharged from nozzles 30 into the lower portion of chamber 14 toward the center of tank 10.

A removable, perforated, flat, circular disc 32 is supported in each hole 25 and provides means for selectively controlling and individually changing the size of each such hole. Preferably, each disc 32 has a single perforation 33 through its center. Discs 32 may be supported directly on top of plate means or flanges 28, or, as shown in FIG. 4, trough 16 may define an annular shoulder 35 in each hole 25 upon which a disc 32 is supported. When a clarification process is started-up, the size of the perforation 33 in each disc 32 should be selected to cause the same volume of influent mixture to flow through each nozzle 30 into chamber 14 at a constant velocity. The size of the perforations 33 can be calculated beforehand or can be determined by trial and error. When the process parameters or flow rates change, one or more discs 32 can be removed and replaced with other discs having different sized perforations 33 that cause the solid separation process to perform as required.

Solids which settle on bottom 12 may be scraped into sludge pit 13 by conventional rakes 37 or similar means connected to a shaft 38 and rotated by a conventional power unit (not shown). The solids may be pumped out of pit 13 through an outlet pipe 39.

It has been discovered that use of means such as perforated discs 32 which selectively control or change the size of holes 25 permits influent trough 16 to have a generally uniform cross section yet the pressure head over each downcomer 26 can be generally identical; this will cause the about same volume of the influent mixture to flow out of each nozzle 30. The reason is that when the influent mixture approaches a hole 25 it has a specific velocity, and after some of the mixture has flowed into the hole the velocity decreases and the depth of the flow downstream from the hole rises. This is caused by the conversion of kinetic energy to static energy and by the conservation of energy, and the rise in depth will approximately equal the loss in velocity head $V^2/2g$. Trough 16 is designed so that the friction energy loss between any given hole and the preceding hole is generally equal to the velocity energy decrease (or pressure head increase) at such hole; this causes the static head over each downcomer conduit 26 to be about the same, and since all conduits 26 and nozzles 30 are identical, about the same volume of influent mixture flows into chamber 14 through each nozzle. This desirable result is achieved even though the velocity of the influent mixture decreases as it flows around inlet trough 16, because the size of each hole 25 can be controlled or changed to the precise dimension needed to cause the necessary rise in depth at each hole.

It has thus been shown that by the practice of this invention the size of the influent flow holes 25 can be selectively controlled in a way which balances static and dynamic energy losses so as to cause the same general volume of influent mixture to be discharged into settling chamber 14 by each nozzle 30. When process conditions or flow rates change, discs 32 with different sized perforations 33 may be easily substituted for those previously used to again attain balanced flow through nozzles 30. Discs 32 are relatively inexpensive to manufacture, and holes 25 with such discs therein are easily cleaned and maintained. The cost of tank 10 is also reduced because holes 25 are all the same size and need not be made to close tolerances, and influent trough 16 may have a uniform cross section.

While the present invention has been described with reference to particular embodiments, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. Apparatus for separating solids from liquids by gravitational settling of such solids in the liquid, comprising:
   (a) a settling tank having an upstanding peripheral side wall;
   (b) an inlet trough for a mixture of such solids and liquid adjacent the upper end of said side wall, there being a plurality of spaced holes passing through said trough and communicating with the inside of said settling tank;
   (c) means for selectively controlling and individually changing the size of each of said holes;
   (d) an outlet for clarified liquid; and
   (e) an outlet for solids settled from said liquid.

2. Apparatus for separating solids from liquids by gravitational settling of such solids in the liquid, comprising:
   (a) a settling tank having an upstanding peripheral side wall;
   (b) an inlet trough for a mixture of such solids and liquid adjacent the upper end of said side wall, there being a plurality of spaced holes passing through said trough and communicating with the inside of said settling tank;
   (c) means for selectively controlling and individually changing the size of each of said holes comprising a removable perforated disc at each of said holes;
   (d) an outlet for clarified liquid; and
   (e) an outlet for solids settled from said liquid.

3. The invention defined in claim 2, wherein each disc has a single perforation through its center.

4. The invention defined in claim 3, wherein said trough defines a shoulder at each hole, and said discs are supported on such shoulders.

5. The invention defined in claim 3, wherein perforated plate means is attached to said trough below each hole, and said discs are supported on such plate means.

6. Apparatus for separating solids from liquids by gravitation settling of such solids in the liquid, comprising:
   (a) a settling tank having a bottom and an upstanding peripheral side wall;
   (b) an inlet trough for a mixture of such solids and liquid adjacent the upper end of said side wall, there being a plurality of uniformly spaced holes passing through the bottom of said trough;
   (c) a plurality of inlet conduits, each having its upper inlet end connected to said trough at one of said holes and its lower discharge end pointing toward the center of said tank adjacent its bottom;
   (d) means for selectively controlling and individually changing the size of each of said holes;
   (e) an outlet for clarified liquid adjacent the upper periphery of said tank; and
   (f) an outlet for settled solids adjacent the bottom center of said tank.

7. Apparatus for separating solids from liquids by gravitation settling of such solids in the liquid, comprising:
   (a) a settling tank having a bottom and an upstanding peripheral side wall;
   (b) an inlet trough for a mixture of such solids and liquid adjacent the upper end of said side wall, there being a plurality of uniformly spaced holes passing through the bottom of said trough;
   (c) a plurality of inlet conduits, each having its upper inlet end connected to said trough at one of said holes and its lower discharge end pointing toward the center of said tank adjacent its bottom;
   (d) means for selectively controlling and individually changing the size of each of said holes comprising a removable perforated disc at each of said holes;
   (e) an outlet for clarified liquid adjacent the upper periphery of said tank; and
   (f) an outlet for settled solids adjacent the bottom center of said tank.

8. The invention defined in claim 7, wherein said trough has a substantially uniform cross section and said inlet conduits are arranged in pairs with their outlet ends diametrically opposed.

9. The invention defined in claim 7, wherein said trough defines a shoulder at each hole, and said discs are supported on said shoulders.

10. The invention defined in claim 7, wherein perforated plate means is attached to said trough at each hole, and said discs are supported on such plate means.

11. The invention defined in claim 7, wherein said plate means are integral with said upper ends of said inlet conduits and are attached beneath said holes.

12. The invention defined in claim 10, wherein said holes and discs are circular, and each disc has a single perforation through its center.

13. A clarifier for separating solids from liquids by gravitation settling of such solids in the liquid, comprising:
   (a) a generally cylindrical settling tank having a bottom and an upstanding peripheral side wall;

(b) a uniformly cross sectioned inlet trough for a mixture of such solids and liquid adjacent the upper end of said side wall, there being a plurality of circular, uniformly spaced, diametrically opposed holes passing through the bottom of said trough;

(c) a plurality of inlet conduits, each having its upper inlet end connected to said trough below one of said holes and a discharge nozzle at its lower end pointing toward the center of said tank adjacent its bottom;

(d) a removable, circular, flat disc having a single perforation through its center being supported in each hole for selectively controlling and individually changing the size of each of said holes, said perforations being sized such that the volume of said mixture withdrawn through each hole causes the velocity energy decrease at each hole to generally equal the friction energy loss between any hole and the preceding hole, while maintaining about the same volume of flow into said tank through said discharged nozzles;

(e) a peripheral outlet trough for clarified liquid adjacent the upper end of said side wall; and (f) rotatable means for moving settled solids at the bottom of said tank to a central collection pit, and means removing such settled solids from said pit.

14. The method of separating solids from liquid by gravitational settling of such solids in the liquid, comprising:

(a) flowing a mixture of solids and liquid into the lower portion of a settling chamber through a plurality of influent conduits spaced uniformly around the periphery of said chamber;

(b) introducing said mixture serially into the upper end of each of said conduits through holes in a common influent trough located adjacent the upper portion of said chamber;

(c) varying and restricting the size of said holes so that the volume of said mixture withdrawn through each hole causes the velocity energy decrease at each hole to generally equal the friction energy loss between any hole and the preceding hole while maintaining about the same volume of flow into said chamber through each conduit;

(d) withdrawing clarified liquid from said chamber; and (e) withdrawing settled solids from said chamber.

15. The invention defined in claim 14, wherein said mixture flows through an influent trough having a substantially uniform cross section and enters said chamber in opposing streams from influent conduits arranged in diametrically opposed pairs.

* * * * *

UNITED STATES PATENT AND TRADEMARK OFFICE
CERTIFICATE OF CORRECTION

PATENT NO. : 4,127,488
DATED : 11/28/78
INVENTOR(S) : Bell, et al

It is certified that error appears in the above-identified patent and that said Letters Patent are hereby corrected as shown below:

In column 4, line 58 delete "7" and insert --10--.

Signed and Sealed this

Sixth Day of March 1979

[SEAL]

Attest:

RUTH C. MASON
Attesting Officer

DONALD W. BANNER
Commissioner of Patents and Trademarks